United States Patent [19]
Gebhardt et al.

[11] 3,877,551
[45] Apr. 15, 1975

[54] BRAKE DISK FOR A RAILWAY VEHICLE WHEEL
[75] Inventors: Hans Gebhardt; Franz Prahl, both of Munich; Corneliu Popescu, Lohhof, all of Germany
[73] Assignee: Knorr-Bremse GmbH, Munich, Germany
[22] Filed: Sept. 17, 1973
[21] Appl. No.: 397,580

[30] Foreign Application Priority Data
Sept. 22, 1972 Germany............................ 2246517

[52] U.S. Cl.............................. 188/218 XL; 74/450
[51] Int. Cl............................................. F16d 65/10
[58] Field of Search......... 188/218 XL, 73.1; 295/1, 295/5-7; 277/197, 199; 74/450, 230.11; 308/74; 403/332

[56] References Cited
UNITED STATES PATENTS
2,311,434  2/1943  Dusevoir............................. 308/74
2,610,719  9/1952  Hornbostel.................. 188/218 XL
2,683,380  7/1954  Hutton................................. 74/450
2,877,732  3/1959  Eaton................................ 403/332
2,990,218  6/1961  Schlechtendahl..................... 308/74
3,350,960  9/1970  Otto et al...................... 188/218 XL
3,507,370  4/1970  Falch............................ 188/218 XL FOREIGN PATENTS OR APPLICATIONS
1,130,463  10/1968  United Kingdom.......... 188/218 XL
1,151,830  7/1963  Germany...................... 188/218 XL
1,244,834  7/1967  Germany...................... 188/218 XL Primary Examiner—Trygve M. Blix
Assistant Examiner—Edward R. Kazenske
Attorney, Agent, or Firm—Edmund M. Jaskiewicz

[57] ABSTRACT

A brake disk for a railway vehicle wheel comprises two half-rings the ends of which have mating grooves thereon so that the faces of the half-rings directed away from the wheel define a plane. The half-rings are attached by a plurality of radial pins passing through a supporting ring secured immediately inwardly of the rim of the wheel. Bolts having oppositely threaded ends interconnect the ends of the half-rings.

6 Claims, 3 Drawing Figures

BRAKE DISK FOR A RAILWAY VEHICLE WHEEL

The present invention relates to a brake disk for a railway vehicle wheel, more particularly, to such a brake disk having a brake disk ring coaxially with the wheel and consisting of two half-rings which are detachably mounted on the wheel.

A brake disk for a railway vehicle wheel which consists of two half-rings has a substantial advantage over a one-piece brake disk ring in that the two-part brake disk ring can be disassembled from the wheel without removing the wheel from its axle. However, such two-piece brake disk rings are disadvantageous with respect to the useful life of the brake linings of the brake shoes acting upon the brake disk since the joint between the half-rings significantly increases the wear of the brake lining. The increased wear of the lining results primarily from the fact that the two half-rings do not lie in the same plane and thus the ends of the half-rings produce a shaving or shearing effect upon the brake linings. The edges of the half-rings may become misaligned because of assembly tolerances or through thermal stresses produced during the braking operation which in turn may cause a curving or bending of the half-rings.

It was proposed to prevent warping of the brake disk ring because of thermal stresses by positioning the half-rings in such a manner that there was a small clearance between the ends of the half-rings. However, it was found that this proposal did not reduce significantly the wear of the brake linings.

It is therefore the principal object of the present invention to provide a brake disk ring which consists of two half-rings but which avoids increased wear of the brake lining.

It is an additional object of the present invention to provide a two-part brake disk ring which provides greater economy and efficiency in the braking operation.

According to one aspect of the present invention a brake disk for a railway vehicle wheel may comprise a brake disk ring positioned coaxially on the disk portion of a railway vehicle wheel and consisting of two half-rings. Each half-ring has a plane surface directed away from the wheel and the disk ring is detachably mounted on the wheel. The ends of each half-ring are provided with a plurality of radially extending notches. The notches on the ends of one-half ring mate with the notches on the ends of the other half-ring so that the plane surfaces of the half-rings lie on the same plane and the half-rings cannot be displaced axially with respect to each other. As a result, an uneven joint between the engaging edges of the half-rings will not be formed. The avoidance of such an uneven joint will decrease significantly the wear of the brake linings. In order to automatically center the half-rings in the axial direction during assembly thereof the notches may be in the form of helical gearing.

Further objects and advantages of the present invention will be apparent upon reference to the accompanying description when taken in conjunction with the following drawings, which are exemplary, wherein.

Proceeding next to the drawings where in like reference symbols indicate the same parts throughout the various views the specific embodiment of the present invention will be described in detail.

Figure 1:
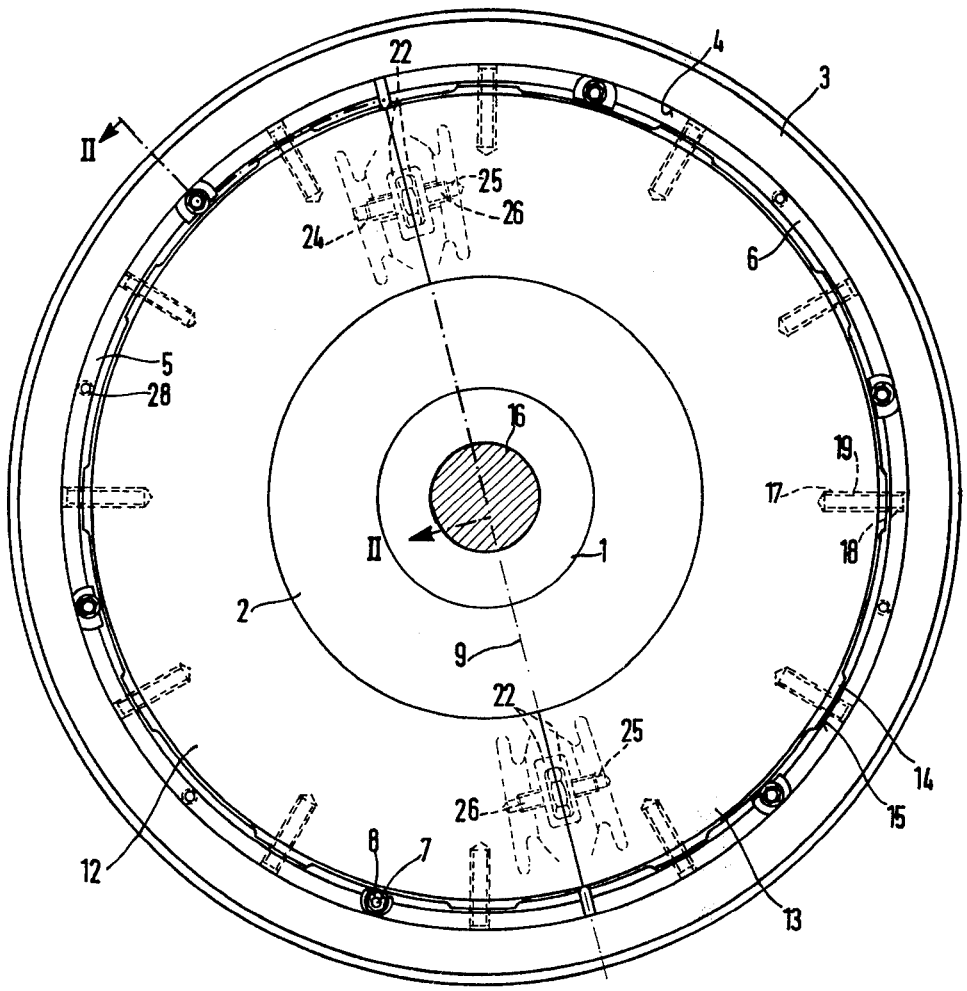
FIG. 1 is side elevational view of a railway vehicle wheel incorporating a brake disk according to the present invention.
Figures 2, 3:
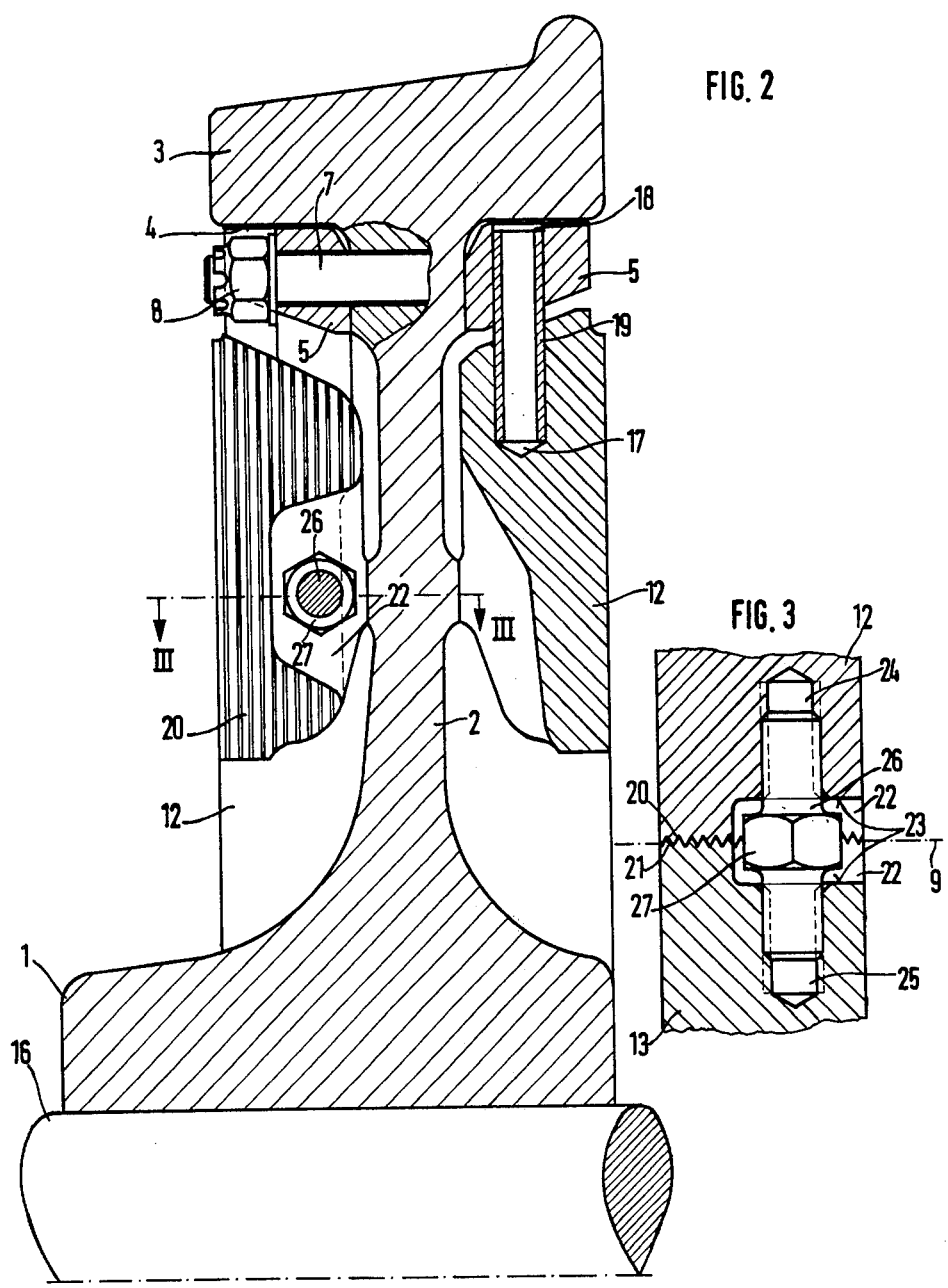
FIG. 2 is a sectional view taken along the line II—II of FIG. 1 and in enlarged scale.
FIG. 3 is a sectional view taken along the line III—III of FIG. 2.

FIGS. 1 and 2 there is shown an integral one-piece railway vehicle wheel comprising a hub 1, a disk portion 2 and a tire or rim 3. A steel supporting ring consisting of two halves 5 and 6 is positioned radially, inwardly of the tire portion 3 so that the outer periphery of the supporting ring is spaced inwardly of the inner peripheral surface of the tire portion. The supporting ring halves 5 and 6 are attached to the disk portion by three bolts 7 for each half with the bolts passing through the disk portion and secured in position by a crown nut 8. The ends of the supporting ring halves 5 and 6 are slightly separated from each other to define a small clearance there between along a plane of separation indicated at 9 in FIG. 1.

Positioned radially inwardly of supporting ring 5, 6 is a brake disk ring of gray cast iron which consists of two half-rings 12 and 13 the ends of which engage each other along a plane of separation coinciding with the plane 9. As can be seen in FIG. 1, brake ring 12, 13 is provided with a plurality of projections 14 uniformly spaced over its outer periphery and the outer faces of the projections indicated at 15 define a cylindrical surface concentric with axle 16 upon which the wheel is mounted. The extension surfaces 15 are radially spaced from the cylinderical inner surface of supporting ring 5, 6.

Within each of the extensions 14, the brake disk ring 12, 13 is provided with a plurality of radially extending bores 17 that coincide with bores 18 passing through the supporting ring 5, 6. Tubular members in the form of sleeves 19 are inserted through the co-extensive bores 17 and 18 to couple the brake disk ring 12, 13 to the supporting ring 5, 6. It is to be noted that the brake disk ring 12, 13 is not supported in any manner on the hub 1 of the wheel.

The mutually facing ends of the half-rings 12 and 13 are each provided with a series of notches or undulations 20 and 21 which extend in a radial direction. The notches may be in the form of helical gearing. The notches or indentations 20 on the ends of half-ring 12 mate with the indentations 21 of half-ring 13 and prevent axial displacement of the half-rings 12 and 13 with respect to each other.

Each end of the half-rings 12 and 13 is provided with a recess 22 which opens on the side directed toward the disk portion 2 of the wheel with the recesses being positioned on either side of the plane of separation 9. Threaded bores 24 and 25 extending perpendicularly to the plane of separation 9 are provided in the mutually facing boundary surfaces 23 of the recesses 22. The bores 24 and 25 are oppositely threaded so as to receive the correspondingly opposite threaded end portions of a bolt 26. Bolt 26 is provided with a head 27 which separates the threaded end portions from each other and is received within the recess 22 (as shown in FIG. 3) when the ends of the half-rings are drawn up to each other as shown.

The half-rings 12 and 13 of the brake disk ring thus attached to each other by two bolts 26 as shown in FIG. 1. When both bolts 26 are tightened, the half-rings 12 and 13 are closely secured to each other because of the oppositely threaded end portions of each of the bolts 26 and the mating indentations 20 and 21 will automatically center the half-rings 12 and 13 in the axial direction.

In the embodiment illustrated in the drawings a two-part supporting ring 5, 6 and a two-part brake disk ring 12, 13 is mounted on each side of the wheel disk. Both of these supporting rings are mounted on the wheel disk 2 by means of the same bolts 7 as can be seen in FIG. 2. It is to be borne in mind, however, that a supporting ring and brake disk ring can be mounted on only one side of the disk portion.

When a brake disk ring 12, 13 is to be removed from the wheel it is not necessary to press the wheel from off of the axle 16 as would be necessary in the case of a one-piece integral brake disk ring. After the bolts 7 have been removed supporting ring 5, 6 and brake disk ring 12, 13 can be removed jointly from inner periphery of the tire 3. Threaded bores 28 are provided in supporting ring 5, 6 for the purpose of threadingly receiving a suitable tool. After subsequent loosening of bolts 26 which then become accessible both the supporting ring 5, 6 and the brake disk ring 12, 13 can be separated into their respective half-rings which can then be removed laterally from the axle 16.

The mounting or assembly of the brake disk ring and supporting ring upon the wheel are achieved in the reverse sequence of operations from that described above. Because of the series of notches 21, 22, the brake ring halves will always assume their original position after repeated mounting and removal.

Each of the half-rings 12 and 13 has a plane surface which is, in effect, the braking surface and upon assembly of the brake disk halves as described above these plane surfaces will define a single plane without any interruptions or uneven edges caused by a misalignment of the ends of the halves. This plane surface is free to cooperate effectively with the brake shoes which are not illustrated. In addition, the brake disk is readily mountable and removable from the wheel without the necessity of removing the wheel from its axle. In the event the brake ring should be subjected to maximum thermal stresses the two half-rings comprising the brake disk ring will not be displaced axially with respect to each other because of the inter-engagement of the notched ends of the halves. However, the brake disk ring is not prevented from expanding in the radial direction.

It will be understood that this invention is susceptible to modification in order to adapt it to different usages and conditions, and accordingly, it is desired to comprehend such modifications within this invention as may fall within the scope of the appended claims.

What is claimed is:

1. A brake disk for a railway vehicle wheel comprising a rim and a disk portion, a brake disk supporting ring positioned coaxially on said disk portion of said railway vehicle wheel, said supporting ring being securely mounted on said railway vehicle wheel radially inwardly of said wheel rim thereof, a brake disk ring being spaced slightly radially inwardly of said supporting ring, means mounting said supporting ring to said brake disk ring, said brake disk ring consisting of two half-rings, said half-rings each having a plane surface directed away from the wheel and a recess opening in the ends of said half-rings on the side of said brake disk ring directed toward said disk portion of the wheel, there being a plurality of radially extending notches and indentations on each end of said half-rings, said notches on the ends of one half-ring mating with the indentations on the ends of the other half-ring such that the plane surfaces of both half-rings lie in the same plane, and bolt means, received in said recess opening, interconnecting the mating ends of said half-rings, said bolt means passing perpendicularly through a plane of separation defined by the ends of said half-rings and retaining said half-rings together.

2. A brake disk as claimed in claim 1 wherein said mounting means comprises a plurality of pins extending radially through said supporting ring into said brake disk ring to secure said brake disk ring in position.

3. A brake disk as claimed in claim 2 wherein each of said interconnecting bolt means has opposite threads on each end thereof, there being correspondingly threaded bores in the ends of said half-rings and said bores being parallel to said half-ring plane surfaces.

4. A brake disk as claimed in claim 3 wherein said interconnecting bolt means has a head separating the threaded end portions of the bolt means and said bolt head being received within said recess.

5. A brake disk as claimed in claim 2 wherein said supporting ring consists of two half-rings whose plane of separation coincides with said plane of separation of said brake disk ring.

6. A brake disk as claimed in claim 5 wherein said bolt means comprises a plurality of bolts passing through said disk portion of the wheel and securing said supporting ring halves thereto.

* * * * *